(12) United States Patent

Lofgren et al.

(10) Patent No.: US 7,550,195 B2
(45) Date of Patent: Jun. 23, 2009

(54) POWER TRANSMISSION BELT

(75) Inventors: Jeffery Dwight Lofgren, Lincoln, NE (US); Larry Dean Goettsch, Lincoln, NE (US); Wesley James Billups, Lincoln, NE (US)

(73) Assignee: Veyance Technologies, Inc., Fairlawn, OH (US)

( * ) Notice: Subject to any disclaimer, the term of this patent is extended or adjusted under 35 U.S.C. 154(b) by 568 days.

(21) Appl. No.: 11/018,822

(22) Filed: Dec. 21, 2004

(65) Prior Publication Data

US 2005/0119082 A1    Jun. 2, 2005

Related U.S. Application Data

(63) Continuation-in-part of application No. 10/316,723, filed on Dec. 11, 2002, now Pat. No. 7,037,578.

(51) Int. Cl.
*B32B 25/02* (2006.01)
*B32B 7/02* (2006.01)
*B32B 27/32* (2006.01)
*B05D 3/04* (2006.01)

(52) U.S. Cl. .................... 428/295.1; 428/212; 428/521; 428/522; 427/302; 474/237

(58) Field of Classification Search ............. 428/295.1, 428/521, 522, 212; 427/302; 474/237
See application file for complete search history.

(56) References Cited

U.S. PATENT DOCUMENTS 3,637,550 A    1/1972   Sprauer ................. 260/18
4,264,655 A    4/1981   Brook ................... 427/381
4,328,324 A    5/1982   Kock et al. ............. 525/423
4,992,515 A    2/1991   Ballard ................. 526/482
5,109,054 A    4/1992   Smith ................... 524/514
5,201,689 A    4/1993   Lijten et al. ........... 474/268
5,246,735 A    9/1993   Takata et al. ........... 427/175
5,624,765 A *  4/1997   Toukairin et al. ........ 428/492
5,882,388 A    3/1999   Adair et al. ............ 106/31.6
5,891,561 A    4/1999   Kinoshita et al. ........ 428/295.1
5,944,895 A    8/1999   Mactani et al. .......... 118/420
6,117,549 A    9/2000   Gibbon ................. 428/373
6,177,202 B1   1/2001   Takehara et al.
6,358,609 B2   3/2002   Kinoshita et al. ........ 428/375
6,453,960 B1   9/2002   Kondo et al. ............ 152/451

FOREIGN PATENT DOCUMENTS

EP    1 081 180 A1   3/2001
EP    1 241 379      9/2002
GB    1091206        11/1967

OTHER PUBLICATIONS

European Search Report.

* cited by examiner

*Primary Examiner*—Jennifer McNeil
*Assistant Examiner*—Lawrence D Ferguson
(74) *Attorney, Agent, or Firm*—Alvin T. Rockhill; Kathleen K. Bowen

(57) ABSTRACT

The present invention is directed to an endless power transmission belt having an elastomeric body and at least one treated textile fabric, the treated textile fabric including a first treatment including a polyamide and an epoxy; and optionally, a second treatment including an RFL adhesive.

20 Claims, 1 Drawing Sheet

POWER TRANSMISSION BELT

CROSS REFERENCE TO RELATED APPLICATIONS

This application is a continuation-in-part of Ser. No. 10/316,723 filed Dec. 11, 2002, now U.S. Pat. No. 7,037,578.

BACKGROUND OF THE INVENTION

Endless power transmission belts typically include textile fabrics and fibrous cords embedded in an elastomeric matrix. Cords and fabric made from aromatic polyamide (or aramid) fiber such as Kevlar provide good strength to the belt, but are prone to fraying during cutting operations. Previous attempts to reduce the fraying of the Kevlar cord or fabric have utilized pretreatment with a solution of isocyanates and epoxies, followed by conventional treatment with a RFL adhesive. While the pretreatment with isocyanates and epoxies provides improvement in the resistance to fray and cuttability of the belt, the isocyanates also are detrimental to the flex life of the belt. Isocyanate treatments also are insufficiently effective in preventing moisture absorption which leads to change in belt length. There is, therefore, a need for an improved pretreatment of Kevlar and other types of cords or fabric for use in belts.

SUMMARY OF THE INVENTION

The present invention is directed to an endless power transmission belt comprising an elastomeric body and at least one treated textile fabric, the treated textile fabric comprising a first treatment comprising a polyamide and an epoxy; and optionally, a second treatment comprising an RFL adhesive.

The present invention is also directed to a method of treating a textile fabric for use in an endless power transmission belt, comprising a first step of treating said textile fabric with a liquid comprising a polyamide and an epoxy, and optionally, a second step of treating the textile fabric with an RFL liquid.

BRIEF DESCRIPTION OF THE FIGURES

The accompanying figures show embodiments of this invention in which.

DETAILED DESCRIPTION OF THE INVENTION

In one embodiment, the present invention is directed to an endless power transmission belt comprising a treated fiber embedded in an elastomeric body, the treated fiber comprising a first treatment comprising a nylon and an epoxy, and optionally, a second treatment comprising an RFL adhesive. In another embodiment, the present invention is directed to a method of treating a fiber for use in an endless power transmission belt, comprising a first step of treating said fiber with a liquid comprising a nylon and an epoxy; and optionally, a second step of treating said fiber with an RFL liquid.

In another embodiment, the present invention is directed to an endless power transmission belt comprising an elastomeric body and at least one treated textile fabric, the treated textile fabric comprising a first treatment comprising a polyamide and an epoxy; and optionally, a second treatment comprising an RFL adhesive. In another embodiment, the present invention is directed to a method of treating a textile fabric for use in an endless power transmission belt, comprising a first step of treating said textile fabric with a liquid comprising a polyamide and an epoxy, and optionally, a second step of treating the textile fabric with an RFL liquid.

It is to be understood that reference herein to "parts", "parts by weight" and "phr" means "parts by weight per hundred parts by weight of rubber".

The present invention relates to a new and improved power transmission belt. The power transmission belt of the present invention may be embodied in accordance with the three conventional-type of designs of power transmission belt. In the first design, the cushion section is fabric-faced, ground short fiber-reinforced cushion section or molded gum with short fiber flocked faced cushion section. In the second design, the cushion section has a cut edge or fabric jacketless belt which has plies of rubber-coated fabric or plies of fiber-reinforced stock as the base material. The third design is a textile-jacketed belt which is wrapped with one or more jackets of textile fabric.

Figure 1:
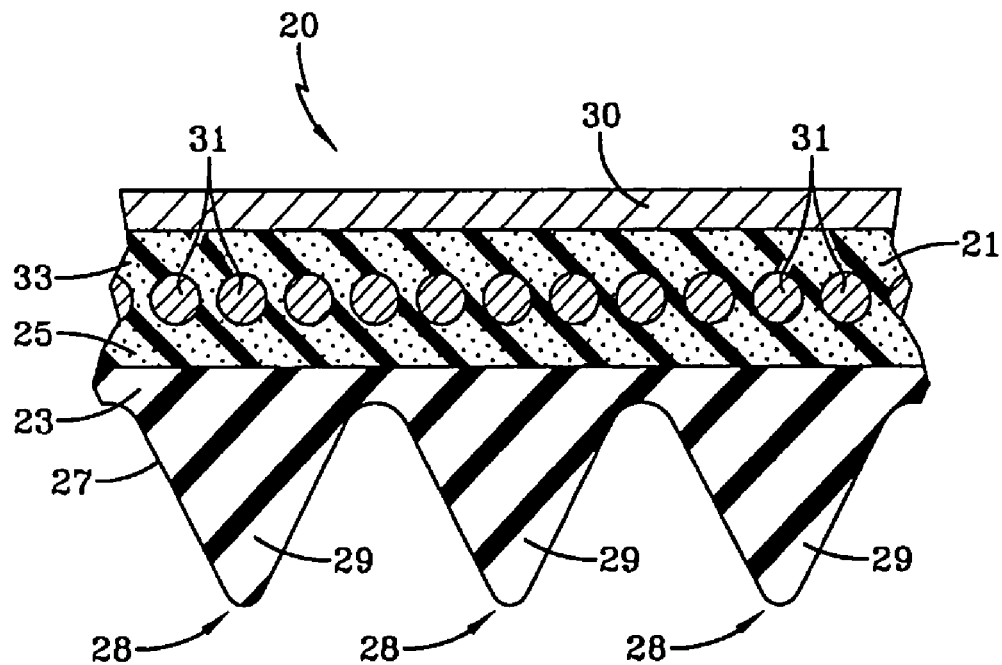
FIG. 1 is a fragmentary perspective view illustrating one embodiment of an endless power transmission belt of this invention.

Reference is now made to FIG. 1 of the drawing which illustrates an endless power transmission belt structure or belt of this invention which is designated generally by the reference numeral 20. The belt 20 is particularly adapted to be used in associated sheaves in accordance with techniques known in the art. The belt is particularly suited for use in short center drives, exercise equipment, automotive drives, farm equipment, so-called torque sensing drives, application where shock loads of varying belt tension are imposed on the belt, applications where the belt is operated at variable speeds, applications where the belt is spring-loaded to control its tension, and the like.

The belt 20 comprises a tension section 21, a cushion section 23 and a load-carrying section 25 disposed between the tension section 21 and cushion section 23. The belt 20 may optionally have an inside ply or inner fabric layer 27, adhered to the drive surface 28 of the ribs 29. The belt 20 of FIG. 1 has a fabric backing 30. The fabric backing 30 may be bi-directional, non-woven, woven or knitted fabric. The fabric-backing layer 30 may be frictioned, dipped, spread, coated or laminated.

In accordance with the belt of FIG. 1, the fabric-facing layer 27 may be made from a bi-directional, non-woven, woven or knitted fabric. The preferred fabric layer 27 is non-woven.

The fabrics to be used on the facing layer 27 may be made of conventional materials including nylon (such as nylon 4,6, nylon 6,6 and nylon 6), polyester/rayon, cotton, cotton/rayon, polyester, cotton/polyester, nylon/polyester, cotton/nylon, Lycra™ (segmented polyurethane), aramid, rayon, and the like. In one embodiment, the fabric is made of polyester/rayon. In another embodiment, the fabric is made of aramid (aromatic polyamide).

In another embodiment (not shown), the power transmission belt may include a fabric as a backing layer, for example The load-carrying section 25 has load-carrying means in the form of load-carrying cords 31 or filaments which are embedded in an elastomeric matrix 33 in accordance with techniques which are well known in the art. The cords 31 generally extend lengthwise through the elastomeric matrix 33. The cords 31 or filaments may be made of any suitable material known and used in the art. Representative examples of such materials include aramids, fiberglass, nylon, polyester, cotton, steel, carbon fiber and polybenzoxazole. In one embodiment, the cords or filaments are made from fibers of aramid, otherwise known as aromatic polyamide. Aramid fibers are available commercially, including but not limited to those sold under the trademark Kevlar from DuPont.

The drive surface 28 of the belt 20 of FIG. 1 is multi-V-grooved. In accordance with other embodiments, it is contemplated herein the belts of the present invention also include those belts where the drive surface of the belt may be flat, single V-grooved and synchronous. Representative examples of synchronous include belts having trapezoidal or curvilinear teeth. The tooth design may have a helical offset tooth design such as shown in U.S. Pat. Nos. 5,209,705 and 5,421,789.

The belt 20 of FIG. 1 has one drive surface 28. However, it is contemplated herein that the belt may have two drive surfaces (not shown) such as in a double-sided belt. In such an instance, one or both drive surfaces may be with fabric as described herein. Preferably, the belt 20 has one drive surface.

The elastomeric compositions for use in the tension section 21 and cushion section 23, and load-carrying section 25, may be the same or different.

Figure 2:
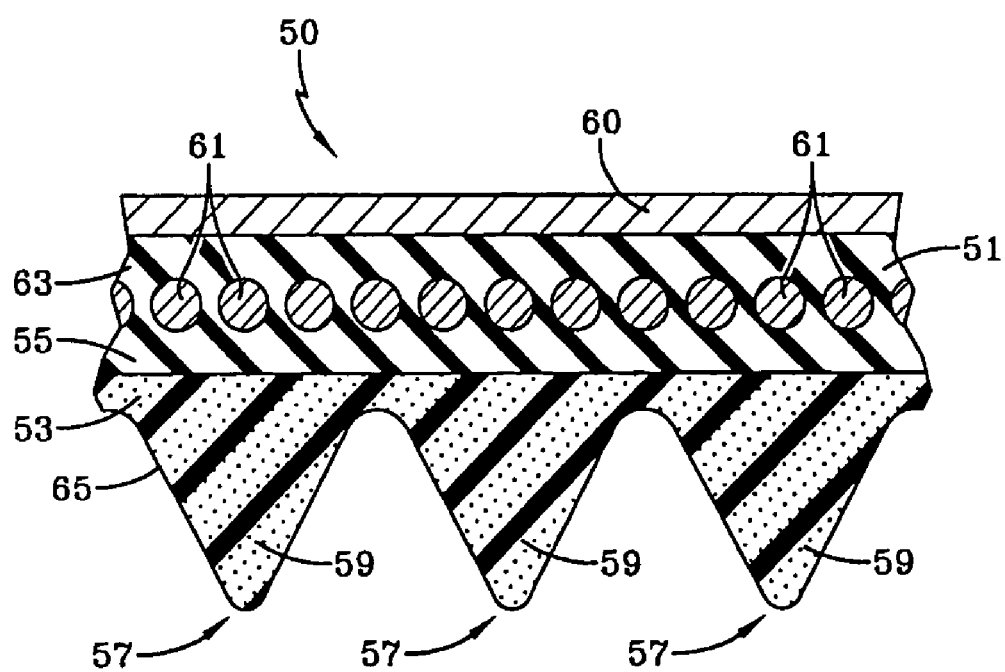
FIG. 2 is a fragmentary perspective view illustrating one embodiment of an endless power transmission belt of this invention.

Referring to FIG. 2, there is shown an endless power transmission belt 50 according to another embodiment. Similar to the belt 20 of FIG. 1, the belt 50 comprises a tension section 51, a cushion section 53 and a load-carrying section 55 disposed between the tension section 51 and cushion section 53. Unlike the belt 20 of FIG. 1, the belt 50 of FIG. 2 does not have a fabric layer on the drive surface 57. The belt 50 of FIG. 1 does have a plurality of ribs 59 or Vs and a fabric backing 60. The load-carrying section 55 has load-carrying means in the form of load-carrying cords 61 or filaments which are embedded in an elastomeric matrix 63. The elastomeric compound located in the cushion section 53 is illustrated as being fiber loaded 65.

The load-carrying fibrous cord is treated with a first treatment comprising a polyamide and an epoxy. The load-carrying cord may optionally be treated with a second treatment after the first treatment. One optional second treatment may be treatment with an resorcinol-formaldehyde liquid (RFL) as is known in the art, for example, as in U.S. Pat. No. 5,891,561. The first treatment and second treatment, if any, may be applied to the fiber using any of the various liquid treatment methods for fiber as are known in the art, including but not limited to the methods of U.S. Pat. No. 5,944,895. "Treatment" or "treated" refers to the process or result of a process wherein a fiber or fiber cord is exposed to a liquid composition such that solids dissolved or dispersed in the liquid medium remain on the surface of the fibers after devolatilization of the liquid medium and any required curing.

In another embodiment, the transmission belt may include a textile fabric treated with the first treatment and optionally with the second treatment. The treated textile fabric may be a fabric facing layer (27), fabric backing (30, 60), or a fabric reinforcement layer (not shown) used in conjunction with or instead of the load carrying cords. Further discussion of the first and second treatments as applied to the fiber or fiber cord apply equally to treatment of a textile fabric, both regarding the method of treatment and the use of the treated fabric in the power transmission belt.

The first treatment comprising a polyamide and an epoxy may be applied from a liquid. The liquid may be in the form of a solution or a dispersion. In one embodiment, the liquid may comprise from about 3 to about 20 percent by weight of polyamide, and from about 1 to about 10 percent by weight of epoxy. Alternatively, the liquid may comprise from about 5 to about 15 percent by weight of polyamide, and from about 3 to about 7 percent by weight of epoxy.

In one embodiment, upon application of the liquid or dispersion and removal of the solvent or dispersion carrier (eg water), the epoxy and polyamide solids in the first treatment disposed on the fiber cord or textile fabric will comprise from about 23 to about 95 percent by weight of polyamide, and from about 77 to about 5 percent by weight epoxy, based on the added weight of the polyamide and epoxy first treatment solids. In another embodiment, the solids disposed on the fiber cord or textile fabric will comprise from about 42 to about 83 percent by weight of polyamide, and from about 58 to about 17 percent by weight of epoxy, based on the total weight of the polyamide and epoxy first treatment solids.

Suitable polyamides, also known as nylons, for use in the first treatment may include any of various organic solvent soluble, but water insoluble, polyamides as are known in the art. Such polyamides may be produced following the teachings of U.S. Pat. No. 3,637,550, fully incorporated herein by reference. In one embodiment, a suitable polyamide is any of the polyamide copolymers and terpolymers soluble in ethanol and other aliphatic alcohols and mixtures thereof. Suitable polyamides are available commercially, including but not limited to polyamides available under the trademarks Elvamide, including Elvamide 8061 from Dupont, Gental from General Plastics Corp., and Arrochem NR from Arrochem, Inc.

Suitable epoxies for use in the first treatment include any of various epoxies as are known in the art, including but not limited to glycidyl ether of bisphenol-A type epoxies. Suitable epoxies are available commercially, including but not limited to epoxies available under the trademarks Denecol including Denacol EX-313 from Nagase Chemicals LTD., DER from Dow Chemical, and EPON from Shell.

The first treatment comprising a polyamide and an epoxy may be applied from a liquid. In one embodiment, the liquid may be in the form of a solution. The solution may include a solvent selected from any suitable solvent for the polyamide and epoxy, including but not limited to linear and branched, primary and secondary alcohols. Suitable alcohols may include methanol, ethanol, propanol, n-butanol, 2-butanol, isopropanol, etc., and mixtures thereof. In one embodiment, the solvent is a mixed solvent of ethanol and water, with ethanol present in a range of from about 70 to about 95 percent by weight, and water present in a range of from about 5 to about 20 percent by weight. The solution may also include a hardener for the epoxy, including but not limited to amine-type epoxy hardeners.

In another embodiment, the liquid used in the application of the first treatment may be in the form of a liquid dispersion. In this embodiment, the polyamide and epoxy may be dispersed in an aqueous dispersion as is known in the art. The dispersion may also include any of various surfactants and wetting agents as are known in the art. The dispersion may also include a hardener for the epoxy, including but not limited to amine-type epoxy hardeners. Water dispersible polyamides may be produced following the teachings of U.S. Pat. No. 5,109,054, fully incorporated herein by reference. Suitable aqueous dispersions of polyamide terpolymers are available commercially under the trademarks Genton from General Plastics Corp. and Micromid from Arizona Chemical Company.

The elastomeric composition for use in the tension section and/or cushion section and/or load-carrying section contains 100 parts of a rubber. Such rubber may be selected from the group consisting of ethylene-alpha-olefin rubber, silicone rubber, polychloroprene, polybutadiene, epichlorohydrin, acrylonitrile rubber, hydrogenated acrylonitrile rubber, zinc salts of unsaturated carboxylic acid ester grafted hydrogenated nitrile butadiene elastomer, natural rubber, synthetic cis-1,4-polyisoprene, styrene-butadiene rubber, ethylene-vinyl-acetate copolymer, ethylene methacrylate copolymers and terpolymers, chlorinated polyethylene, chlorosulfonated polyethylene, alkylated chlorosulfonated polyethylene, trans-polyoctenamer, polyacrylic rubber, non-acrylated cis-1,4-polybutadiene, polyurethanes, and mixtures thereof. The preferred rubbers are EPDM, hydrogenated acrylonitrile rubber, natural rubber, polybutadiene and styrene-butadiene rubber.

The ethylene-alpha-olefin elastomer includes copolymers composed of ethylene and propylene units (EPM), ethylene and butene units, ethylene and pentene units or ethylene and octene units (EOM) and terpolymers composed of ethylene and propylene units and an unsaturated component (EPDM), ethylene and butene units and an unsaturated component, ethylene and pentene units and an unsaturated component, ethylene and octene units and an unsaturated component, as well as mixtures thereof. As the unsaturated component of the terpolymer, any appropriate non-conjugated diene may be used, including, for example, 1,4-hexadiene, dicyclopentadiene or ethylidenenorbornene (ENB). The ethylene-alpha-olefin elastomer preferred in the present invention contains from about 35 percent by weight to about 90 percent by weight of the ethylene unit, from about 65 percent by weight to about 5 percent by weight of the propylene or octene unit, and 0 to 10 percent by weight of the unsaturated component. In a more preferred embodiment, the ethylene-alpha-olefin elastomer contains from about 50 percent to about 70 percent by weight of the ethylene unit and, in a most preferred embodiment, the ethylene-alpha-olefin elastomer contains from about 55 percent to about 65 percent of the ethylene unit. The most preferred ethylene-alpha-olefin elastomer is EPDM.

Conventional carbon blacks may also be present in the composition. Such carbon blacks are used in conventional amounts ranging from 1 to 30 phr. Representative examples of carbon blacks which may be used include those known by their ASTM designations N110, N121, N242, N293, N299, N315, N326, N330, M332, N339, N343, N347, N351, N358, N375, N550, N582, N630, N624, N650, N660, N683, N754, N762, N907, N908, N990 and N991.

A conventional acid acceptor may be present in the elastomer. Acid acceptors are known to improve the heat resistance of the rubber. Representative acid acceptors include pentaerythritol, magnesium oxide, litharge (PbO), red lead ($Pb_3O_4$), dythal (dibasic lead phthalate), trimal (tribasic lead maleate), epoxy resins, epoxidized oils, calcium hydroxide ($Ca(OH_2)$), calcium aluminate hexahydrate, magnesium hydratalate, a magnesium oxide-aluminum oxide solid solution and mixtures thereof. The magnesium oxide-aluminum oxide solid solution is generally represented by $Mg_{0.7}A_{10.3}O_{1.15}$. Representative of suitable magnesium oxide-aluminum oxide solid solutions are KW-2000 and KW-2100, both commercially available from Kyowa Kagaku Kogyo Co, Ltd, and the like. If used, the amount of the acid acceptor that is utilized ranges from about 1 to about 50 phr, preferably about 2 to about 20 phr.

It is readily understood by those having skill in the art that the rubber composition would be compounded by methods generally known in the rubber compounding art, such as mixing the various constituent rubbers with various commonly-used additive materials such as, for example, curing aids and processing additives, such as oils, resins including tackifying resins and plasticizers, fillers, pigments, fatty acid, waxes, antioxidants and antiozonants. The additives mentioned above are selected and commonly used in conventional amounts. Typical amounts of tackifier resins, if used, comprise about 0.5 to about 10 phr, usually about 1 to about 5 phr. Typical amounts of processing aids comprise about 1 to about 50 phr. Such processing aids can include, for example, polyethylene glycol, naphthenic and/or paraffinic processing oils. Typical amounts of antioxidants comprise about 1 to about 5 phr. A representative antioxidant is trimethyl-dihydroquinoline. Typical amounts of fatty acids, if used, which can include stearic acid comprise about 0.5 to about 3 phr. Typical amounts of waxes comprise about 1 to about 5 phr. Often microcrystalline and carnauba waxes are used. Typical amounts of plasticizer, if used, comprise from 1 to 100 phr. Representative examples of such plasticizers include dioctyl sebacate, chlorinated paraffins, and the like.

Various non-carbon black fillers and/or reinforcing agents may be added to increase the strength and integrity of the rubber composition for making the power transmission belt of the present invention. An example of a reinforcing agent is silica. Silica may be used in the present composition in amounts from about zero to 80 parts, and preferably about 10 to 20 parts, by weight based on 100 parts of rubber.

The elastomer composition may also have other fibers or flock distributed throughout. This is particularly the case, as shown in FIG. 2, when the elastomer is used in the cushion section of the belt. The fibers or flock to be distributed throughout the elastomer mix may be any suitable material, and is preferably non-metallic fibers such as cotton or fibers made of a suitable synthetic material including kevlar, nylon, polyester, PTFE, fiberglass, and the like. Each fiber may have a diameter ranging between 0.001 inch to 0.050 inch (0.025 mm to 1.3 mm) and length ranging between 0.001 inch to 0.5 inch (0.025 mm to 12.5 mm). The fibers may be used in an amount ranging from 1 to 50 phr. Preferably, the fibers may be present in an amount ranging from 1 to 20 phr.

In addition to the above, solid inorganic lubricants may be present in the mixture of ethylene-alpha-olefin elastomer and polybutadiene adduct. Representative examples of such lubricants include molybdenum disulfide, PTFE, molybdenum diselenide, graphite, antimony trioxide, tungsten disulfide, talc, mica, tungsten diselenide and mixtures thereof. The amount of such solid inorganic lubricants, if used, will generally range from 1 to 25 phr.

The rubber composition may be cross-linked by sulfur, UV cure or peroxide cure system. Well-known classes of peroxides that may be used include diacyl peroxides, peroxyesters, dialkyl peroxides and peroxyketals. Specific examples include dicumyl peroxide, n-butyl-4,4-di(t-butylperoxy)valerate, 1,1-di(t-butylperoxy)-3,3,5-trimethylcyclohexane, 1,1-di(t-butylperoxy)cyclohexane, 1,1-di(t-amylperoxy)cyclohexane, ethyl-3,3-di(t-butylperoxy)butyrate, ethyl-3,3-di (t-amylperoxy)butyrate, 2,5-dimethyl-2,5-di(t-butylperoxy) hexane, t-butyl cumyl peroxide, $\alpha,\alpha'$-bis(t-butylperoxy) diisopropylbenzene, di-t-butyl peroxide, 2,5-dimethyl-2,5-di (t-butylperoxy)hexyne-3, t-butyl perbenzoate, 4-methyl-4-t-butylperoxy-2-pentanone and mixtures thereof. The preferred peroxide is $\alpha,\alpha'$-bis(t-butylperoxy) diisopropylbenzene. Typical amounts of peroxide ranges from 1 to 12 phr (based on active parts of peroxide). Preferably, the amount of peroxide ranges from 2 to 6 phr.

A co-agent is present during the free radical crosslinking reaction. Co-agents are monofunctional and polyfunctional unsaturated organic compounds which are used in conjunction with the free radical initiators to achieve improved vulcanization properties. Representative examples include organic acrylates, organic methacrylates, divinyl esters, divinyl benzene, bis-maleimides, triallylcyanurates, polyalkyl ethers and esters, metal salts of an alpha-beta unsaturated organic acid and mixtures thereof.

The co-agent may be present in a range of levels. Generally speaking, the co-agent is present in an amount ranging from 0.1 to 40 phr. Preferably, the co-agent is present in an amount ranging from 2 to 15 phr.

As mentioned above, one class of co-agents are acrylates and methacrylates. Representative examples of such co-agents include di-, tri-, tetra- and penta-functional acrylates, di-, tri-, tetra- and penta-functional methacrylates and mixtures thereof. Specific examples of such co-agents include 1,3-butylene glycol diacrylate, 1,3-butylene glycol dimethacrylate, 1,4-butanediol diacrylate, 1,4-butanediol dimethacrylate, 1,6 hexanediol diacrylate, 1,6 hexanediol dimethacrylate, 2-henoxyethyl acrylate, alkoxylated diacrylate, alkoxylated nonyl phenol acrylate, allyl methacrylate, caprolactone acrylate, cyclohexane dimethanol diacrylate, cyclohexane dimethanol, methacrylate diethylene glycol diacrylate, diethylene glycol dimethacrylate, dipentaerythritol pentaacrylate, dipropylene glycol diacrylate, di-trimethylolpropane tetraacrylate, ethoxylated trimethylolpropane triacrylate, ethoxylated bisphenol A dimethacrylate, ethoxylated nonylphenol acrylate, ethoxylated tetrabromo bisphenol A diacrylate, ethoxylated bisphenol A diacrylate, ethoxylated bisphenol dimethacrylate, ethoxylated trimethylolpropane triacrylate, ethoxylated bisphenol A diacrylate, ethylene glycol dimethacrylate, glycidyl methacrylate, highly propoxylated glyceryl triacrylate, isobornyl acrylate, isobornyl methacrylate, isodecyl acrylate, isodecyl methacrylate, isooctyl acrylate, lauryl acrylate, methoxy polyethylene glycol monomethacrylate, methoxy polyethylene glycol monomethacrylate, neopentyl glycol diacrylate, neopentyl glycol dimethacrylate, octyldecyl acrylate, pentaacrylate ester, pentaerythritol tetraacrylate, pentaerythritol triacrylate, polyethylene glycol diacrylate, polyethylene glycol dimethacrylate, propoxylated glyceryl triacrylate, propoxylated neopentyl glycol diacrylate, propoxylated allyl methacrylate, propoxylated glyceryl triacrylate, propoxylated trimethylolpropane triacrylate, propoxylated trimethylolpropane triacrylate, stearyl acrylate, stearyl methacrylate, tetraethylene glycol diacrylate, tetraethylene glycol dimethacrylate, tetrahydrofurfuryl acrylate, tetrahydrofurfuryl methacrylate, tridecyl acrylate, tridecyl methacrylate, triethylene glycol diacrylate, triethylene glycol dimethacrylate, trifunctional acrylate ester, trifunctional methacrylate ester, trimethylolpropane triacrylate, trimethylolpropane triacrylate, trimethylolpropane trimethacrylate, tripropylene glycol diacrylate, tripropylene glycol diacrylate, tris(2-hydroxy ethyl)isocyanurate triacrylate, tris(2-hydroxy ethyl)isocyanurate triacrylate, and tris(2-hydroxy ethyl)isocyanurate trimethacrylate.

The metal salts of α,β-unsaturated organic acids include the metal salts of acids including acrylic, methacrylic, maleic, fumaric, ethacrylic, vinyl-acrylic, itaconic, methyl itaconic, aconitic, methyl aconitic, crotonic, alpha-methylcrotonic, cinnamic and 2,4-dihydroxy cinnamic acids. The metals may be zinc, cadmium, calcium, magnesium, sodium or aluminum. Zinc diacylate and zinc dimethacrylate are preferred.

The elastomeric composition may be cured with a sulfur-vulcanizing agent. Examples of suitable sulfur-vulcanizing agents include elemental sulfur (free sulfur) or sulfur-donating-vulcanizing agents, for example, an amine disulfide, polymeric polysulfide or sulfur olefin adducts. Preferably, the sulfur-vulcanizing agent is elemental sulfur. The amount of sulfur-vulcanizing agent will vary depending on the remaining ingredients, and the particular type of sulfur-vulcanizing agent that is used. Generally speaking, the amount of sulfur-vulcanizing agent ranges from about 0.1 to about 8 phr with a range of from about 1.0 to about 3 being preferred.

Accelerators may be used to control the time and/or temperature required for vulcanization. As known to those skilled in the art, a single accelerator may be used which is present in amounts ranging from about 0.2 to about 3.0 phr. In the alternative, combinations of two or more accelerators may be used which consist of a primary accelerator which is generally used in a larger amount (0.3 to about 3.0 phr), and a secondary accelerator which is generally used in smaller amounts (0.05 to about 1.50 phr) in order to activate and improve the properties of the rubber stock. Combinations of these accelerators have been known to produce synergistic effects on the final properties and are somewhat better than those produced by use of either accelerator alone. Delayed action accelerators also are known to be used which are not affected by normal processing temperatures and produce satisfactory cures at ordinary vulcanization temperatures. Suitable types of accelerators include amines, disulfides, guanidines, thioureas, thiazoles, thiurams, sulfenamides, dithiocarbamates and the xanthates. Examples of specific compounds which are suitable include zinc diethyl-dithiocarbamate, 4,4'-dithiodimorpholine, N,N-di-methyl-S-tert-butylsulfenyldithiocarbamate, tetramethylthiuram disulfide, 2,2'-dibenzothiazyl disulfide, butyraldehydeaniline mercaptobenzothiazole, N-oxydiethylene-2-benzothiazolesulfenamide. Preferably, the accelerator is a sulfenamide.

A class of compounding materials known as scorch retarders are commonly used. Phthalic anhydride, salicylic acid, sodium acetate and N-cyclohexyl thiophthalimide are known retarders. Retarders are generally used in an amount ranging from about 0.1 to 0.5 phr.

The mixing of the rubber composition can be accomplished by methods known to those having skill in the rubber mixing art. For example, the ingredients may be mixed in one stage but are typically mixed in at least two stages, namely at least one non-productive stage followed by a productive mix stage. The final curatives, including vulcanizing agents, are typically mixed in the final stage which is conventionally called the "productive" mix stage in which the mixing typically occurs at a temperature, or ultimate temperature, lower than the mix temperature(s) than the preceding non-productive mix stage(s).

Curing of the rubber composition for use in the belt is generally carried out at conventional temperatures ranging from about 160° C. to 190° C. Preferably, the curing is conducted at temperatures ranging from about 170° C. to 180° C.

As known to those skilled in the art, power transmission belts may be built on a drum device. First, the backing is applied to drum as a sheet. Next, any tension section is applied as a sheet followed by spiraling onto the drum, the cord or tensile members (load-carrying section). Thereafter, the cushion section is applied followed by the fabric, if any. The assembled laminate, or slab, is then cured and cut into the belts in a manner known to those skilled in the art.

The invention is further illustrated by the following non-limiting examples.

EXAMPLE I

In this example, the effect of nylon treatment of Kevlar fiber is compared with conventional isocyanate treatment. Samples of Kevlar cord were treated with an aqueous dispersion containing about 5% by weight of polyamide and about 1% epoxy as indicated in Table 1. The treated cords were then built into toothed belts. These belts were evaluated for tensile strength retention and moisture resistance, and compared to typical isocyanate treated cord as indicated in Table 2 and Table 3.

TABLE 1

| Component | Parts by Weight |
|---|---|
| Water | 100 |
| Denecol EX313[1] | 2.5 |
| Genton 310[2] | 110 |
| NaOH (30%) | 0.1 |

[1]Epoxy resin from Nagase Chemicals Ltd.
[2]Aqueous dispersion of 10% by weight of polyamide terpolymer from General Plastics Corp.

TABLE 2

Tensile Strength[1] (lb./6 dual strand, 1⅛" wide belt)

| Hours | Isocyanate Treated Cord | Nylon Treated Cord |
|---|---|---|
| 0 | 21,020 | 16,965 |
| 48 | 16,915 | 14,703 |
| % Change | −19.5% | −13.3 |

[1]Belts were flex tested at 3500 rpm and 200 lbs. hub tension.

TABLE 3

Change in Belt Center to Center Distance (mm)
(24 hour flex test)

| | Isocyanate Treated Cord | Nylon Treated Cord |
|---|---|---|
| Dry Belt[1] | 1.38 | 1.43 |
| Exposed Belt[2] | 2.53 | 1.95 |
| Change Due To Moisture | 1.15 | 0.52 |

[1]Dry Belt was packaged in a bag with desiccant to ensure dry conditions.
[2]Exposed Belt was not bagged, but was stored at 80° F. and 90% RH for seven (7) days.

As shown in Table 2, the Kevlar cord treated with the polyamide showed better tensile strength retention than the isocyanate treated cords. The polyamide treated cord also showed superior resistance to change in belt length due to moisture uptake. (Table 3.)

While present exemplary embodiments of this invention and methods of practicing the same have been illustrated and described, it will be recognized that this invention may be otherwise variously embodied and practiced within the scope of the following claims.

What is claimed is:

1. An endless power transmission belt comprising:
    an elastomeric body and at least one treated textile fabric, said treated textile fabric comprising:
        a first treatment comprising from 23 to 95 percent by weight of a polyamide and from 77 to 5 percent by weight of an epoxy, based on the added weight of the polyamide and the epoxy first treatment; and
        optionally, a second treatment comprising an RFL adhesive.

2. The endless power transmission belt of claim 1, wherein said treated textile fabric is selected from fabric facing layers, fabric backing layers, and fabric reinforcements.

3. The endless power transmission belt of claim 1, wherein said treated textile fabric comprises an aromatic polyamide fabric.

4. The endless power transmission belt of claim 1, wherein said first treatment is applied to said textile fabric as a liquid solution of polyamide and epoxy.

5. The endless power transmission belt of claim 1, wherein said first treatment is applied to said textile fabric as an aqueous dispersion of polyamide and epoxy.

6. The endless power transmission belt of claim 1, wherein said polyamide is an alcohol soluble polyamide terpolymer.

7. The endless power transmission belt of claim 1, wherein said polyamide is a water dispersible polyamide terpolymer.

8. The endless power transmission belt of claim 1, wherein said epoxy is a glycidyl ether of bisphenol A.

9. The endless power transmission belt of claim 1, wherein said elastomeric body comprises at least one elastomer selected from the group consisting of ethylene-alpha-olefin rubber, silicone rubber, polychloroprene, polybutadiene, epichlorohydrine, acrylonitrile rubber, hydrogenated acrylonitrile rubber, zinc salts of unsaturated carboxylic acid ester grafted hydrogenated nitrile butadiene elastomer, natural rubber, synthetic cis-1,4-polyisoprene, styrene-butadiene rubber, ethylene-vinyl-acetate copolymer, ethylene methacrylate copolymers and terpolymers, chlorinated polyethylene, chlorosulfonated polyethylene, alkylated chlorosulfonated polyethylene, trans-polyoctenamer, polyacrylic rubber, non-acrylated cis-1,4-polybutadiene, polyurethanes, and mixtures thereof.

10. The endless power transmission belt of claim 1, wherein said first treatment is applied to said textile fabric as an aqueous dispersion or liquid solution, either of said aqueous dispersion or liquid solution comprising from about 3 to about 20 percent by weight of polyamide, and from about 1 to about 10 percent by weight of epoxy.

11. An endless power transmission belt comprising:
    an elastomeric body and at least one treated textile fabric, said treated textile fabric comprising:
        a first treatment comprising about 42 to about 83 percent by weight of a polyamide and from about 58 to about 17 percent by weight of an epoxy, based on the added weight of the polyamide and the epoxy first treatment; and
        optionally, a second treatment comprising an RFL adhesive.

12. The endless power transmission belt of claim 11, wherein said treated textile fabric is selected from fabric facing layers, fabric backing layers, and fabric reinforcements.

13. The endless power transmission belt of claim 11, wherein said treated textile fabric comprises an aromatic polyamide fabric.

14. The endless power transmission belt of claim 11, wherein said first treatment is applied to said textile fabric as a liquid solution of polyamide and epoxy.

15. The endless power transmission belt of claim 11, wherein said first treatment is applied to said textile fabric as an aqueous dispersion of polyamide and epoxy.

16. The endless power transmission belt of claim 11, wherein said polyamide is an alcohol soluble polyamide terpolymer.

17. The endless power transmission belt of claim 11, wherein said polyamide is a water dispersible polyamide terpolymer.

18. The endless power transmission belt of claim 11, wherein said epoxy is a glycidyl ether of bisphenol A.

19. The endless power transmission belt of claim 11, wherein said elastomeric body comprises at least one elastomer selected from the group consisting of ethylene-alpha-olefin rubber, silicone rubber, polychloroprene, polybutadiene, epichlorohydrine, acrylonitrile rubber, hydrogenated acrylonitrile rubber, zinc salts of unsaturated carboxylic acid ester grafted hydrogenated nitrile butadiene elastomer, natural rubber, synthetic cis-1,4-polyisoprene, styrene-butadiene rubber, ethylene-vinyl-acetate copolymer, ethylene methacrylate copolymers and terpolymers, chlorinated polyethylene, chlorosulfonated polyethylene, alkylated chlorosulfonated polyethylene, trans-polyoctenamer, polyacrylic rubber, non-acrylated cis-1,4-polybutadiene, polyurethanes, and mixtures thereof.

20. The endless power transmission belt of claim 11, wherein said first treatment is applied to said textile fabric as an aqueous dispersion or liquid solution, either of said aqueous dispersion or liquid solution comprising from about 3 to about 20 percent by weight of polyamide, and from about 1 to about 10 percent by weight of epoxy.

* * * * *